United States Patent
Bai et al.

(10) Patent No.: US 9,295,084 B2
(45) Date of Patent: Mar. 22, 2016

(54) METHOD AND APPARATUS FOR PERFORMING CONTENTION BASED RANDOM ACCESS

(75) Inventors: Wei Bai, Beijing (CN); Haiming Wang, Beijing (CN); Juha Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 47 days.

(21) Appl. No.: 13/702,979

(22) PCT Filed: Jun. 10, 2010

(86) PCT No.: PCT/CN2010/073766
§ 371 (c)(1),
(2), (4) Date: Dec. 7, 2012

(87) PCT Pub. No.: WO2011/153701
PCT Pub. Date: Dec. 15, 2011

(65) Prior Publication Data
US 2013/0077485 A1   Mar. 28, 2013

(51) Int. Cl.
*H04L 12/26* (2006.01)
*H04W 74/08* (2009.01)
*H04W 74/00* (2009.01)

(52) U.S. Cl.
CPC .......... *H04W 74/085* (2013.01); *H04W 74/006* (2013.01); *H04W 74/0833* (2013.01)

(58) Field of Classification Search
CPC ...... H04L 47/10; H04W 72/04; H04W 74/00; H04W 74/004; H04W 74/08
USPC .................................................. 370/230, 329
See application file for complete search history.

(56) References Cited

U.S. PATENT DOCUMENTS

| | | | |
|---|---|---|---|
| 6,674,765 B1 * | 1/2004 | Chuah et al. | 370/458 |
| 2009/0201798 A1 * | 8/2009 | Lee et al. | 370/216 |
| 2010/0296467 A1 * | 11/2010 | Pelletier et al. | 370/329 |

FOREIGN PATENT DOCUMENTS

| | | |
|---|---|---|
| CN | 1863112 | 11/2006 |
| CN | 101300756 A | 11/2008 |
| CN | 101400188 A | 4/2009 |
| CN | 101695196 A | 4/2010 |

OTHER PUBLICATIONS

PCT International Search Report dated Mar. 17, 2011 for PCT application No. PCT/CN2010/073766.

(Continued)

*Primary Examiner* — Afshawn Towfighi
(74) *Attorney, Agent, or Firm* — Mintz Levin Cohn Ferris Glovsky and Popeo, P.C.

(57) ABSTRACT

The disclosure provides a solution for random access in a wireless system, in which there is a plurality of available uplink carriers for the random access. The UE can monitor a random access response to get load related information for the plurality of available uplink carriers, determine one low-loaded uplink carrier according to the load related information, and perform random access in the low-loaded uplink carrier. The eNB can determine load related information for uplink carriers in a wireless system, and send a random access response that contains the load related information for multiple uplink carriers in the wireless system.

11 Claims, 8 Drawing Sheets

(56) References Cited

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.8.0, Dec. 2009.

3GPP TSG RAN WG1 Meeting #59, "Initial Random Access Management for Carrier Aggregation System", R1-094976, Nov. 2009.

* cited by examiner

METHOD AND APPARATUS FOR PERFORMING CONTENTION BASED RANDOM ACCESS

RELATED APPLICATIONS

This application is a national stage application, filed under 35 U.S.C. §371, of PCT Application No. PCT/CN2010/073766, filed on Jun. 10, 2010, the contents of which is incorporated herein by reference in its entirety.

FIELD OF THE INVENTION

The present invention generally relates to wireless communication, and more specifically relates to techniques for contention based random access to a wireless communication system.

BACKGROUND OF THE INVENTION

Wireless communication systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal FDMA (OFDMA) systems. In these wireless communication systems, there are any number of base stations that can support communication for any number of user equipments (UEs). Each UE may communicate with one or more base stations via transmissions on the downlink and uplink. The downlink (DL) refers to the communication link from the base stations to the UEs, and the uplink (UL) refers to the communication link from the UEs to the base stations.

A UE may transmit a random access preamble on the uplink when the UE desires to gain access to the system. A base station may receive the random access preamble, and respond with a random access response that may contain related information for the UE. For example, the following events will trigger random access of a UE, i.e. RRC (Radio Resource Control) connection, RRC re-establishment, handover, UL data arrival when UL non-sync, and DL data arrival when UL non-sync. Furthermore, there are generally two kinds of random access, i.e. contention based random access and non-contention based random access. In a contention based random access, UE will select a random access preamble and RACH (Random Access Channel) itself, so there might be access collision if two UE choose the same random access preamble and RACH, which leads to the failure of the random access.

Although in a number of conventional wireless systems, usually only one UL carrier is available for one UE to perform the contention based random access on it, in some systems, there is a plurality of UL carriers available for a contention based random access of one UE. For example, in a system where an inter-band carrier aggregation is introduced, a random access only on the primary component carrier as in the intra-band carrier aggregation might not be enough. This is because that, multi-TA (Timing Advance) will be needed if the UL component carriers are in the different bands, and before a UE is synchronized to the network, there will be no other way to get timing advance on these component carriers but a random access. So multiple random accesses should be supported to measure the timing advance. That is to say, there may be more than one UL component carriers available for one UE to perform random access.

Then, when a UE desires to gain access to the system on one of the plurality of UL component carriers, for example there are few data to be transmitted without need of all UL component carriers, the UE will face more than one choices, i.e. choosing which UL component carrier to perform the contention based random access. Apparently, random selection will be the simplest way, but if the UE choose one UL component carrier with very high load of random access, it will cause a high failing rate of random access.

Therefore, it will be advantageous to provide a scheme for properly selecting a UL component carrier, to greatly improve the successful possibility of contention based random access and reduce the access delay.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The present invention is directed to provide methods, devices, apparatus and computer programs for performing contention based random access.

A first aspect of the present invention is a method for a random access of a terminal device in a wireless system, in which there is a plurality of available uplink carriers for the random access. The method can comprises monitoring a random access response, to get load related information for the plurality of available uplink carriers; determining one low-loaded uplink carrier according to the load related information; and performing a random access on the low-loaded uplink carrier.

In an exemplary embodiment, the load related information is backoff indicators or indicators of collision probability for all uplink carriers in the wireless system. The determining comprises selecting one available uplink carrier with the lowest backoff value or collision probability as the low loaded uplink carrier.

In an exemplary embodiment, the backoff indicators for the uplink carrier on which a random access preamble corresponding to the random access response is carried, can be carried in the backoff indicator subheader field of the random access response. In an exemplary embodiment, the backoff indicators for other uplink carriers can be carried in the padding field of the random access response, in the sequence of the carrier indexes or the carrier frequency.

In an exemplary embodiment, the indicators of collision probability for uplink carriers comprising at least one of the plurality of available uplink carriers can be carried in the padding field of the random access response, in the sequence of the carrier index or the carrier frequency.

In an exemplary embodiment, said monitoring can comprise selecting one of the plurality of available uplink carrier and one random access channel on the selected uplink carrier; and trying to detect a random access response corresponding to the selected random access channel, to get load related information for at least one of the plurality of available uplink carriers. Then, the determining can further comprise taking the selected uplink carrier as the low-loaded uplink carrier, if no random access response is detected.

In an alternative embodiment, said monitoring can comprise selecting one of the plurality of available uplink carrier and one random access channel on the selected uplink carrier;

sending a random access preamble in the selected random access channel to perform a first random access; and trying to detecting a random access response corresponding to the selected random access channel, to get load related information for at least one of the plurality of available uplink carriers; and continuing to perform the first random access on the selected uplink carrier, and wherein when the first random access is failed and the random access response is detected, said determining of a low-loaded uplink carrier and said performing of a random access on the low-loaded uplink carrier are performed. In an example, said determining can further comprise: select another one of the plurality of available uplink carrier to repeat the above process, if no random access response is detected.

In an exemplary embodiment, said monitoring can comprise selecting one of the plurality of available uplink carrier and one random access channel on the selected uplink carrier; and trying to detect a random access response corresponding to the selected random access channel, to get a backoff indicator for said one available uplink carrier; and said determining comprises: determining whether or not the backeoff value is higher than a predefined threshold, wherein if the backoff value is lower than or equal to the predefined threshold, determining the selected uplink carrier as the low-loaded uplink carrier.

In an alternatively embodiment, said monitoring can comprise selecting one of the plurality of available uplink carrier and one random access channel on the selected uplink carrier; sending a random access preamble to perform a first random access; trying to detect a random access response corresponding to the random access preamble, to get a backoff indicator for said one available uplink carrier; and continuing to perform the first random access on the selected uplink carrier, and wherein when the first random access is failed and the random access response is detected, said determining of a low-loaded uplink carrier and said performing of random access on the low-loaded uplink carrier are performed. Said determining comprises: determining whether or not the backeoff value is higher than a predefined threshold, wherein if the backoff value is lower than or equal to the predefined threshold, determining the selected uplink carrier as the low-loaded uplink carrier.

In an exemplary embodiment, said determining can comprise, if the backoff value is higher than the predefined threshold, repeating said monitoring and said determining again.

In an exemplary embodiment, said determining can comprise if all the detected backoff values are higher than the predefined threshold, selecting one available uplink carrier with the lowest backoff value as the low-loaded uplink carrier.

In an exemplary embodiment, if no random access response is monitored, a random access is performed on the selected available uplink carrier.

In an exemplary embodiment, the predefined threshold can be zero.

A second aspect of the present invention is an apparatus for a random access in a wireless system, in which there is a plurality of available uplink carriers for the random access, the apparatus comprising a processor; and a memory communicatively connected to the processor, the memory comprises computer program codes embodied therein for use with the processor to at least partly cause the apparatus to: monitor a random access response to get load related information for the plurality of available uplink carriers; determine one low-loaded uplink carrier according to the load related information; and perform a random access on the low-loaded uplink carrier.

A third aspect of the present invention is a computer program product comprising a computer-readable medium bearing computer program code embodied therein for use with an apparatus for performing the method of a random access as discussed above.

A fourth aspect of the present invention is an apparatus for a random access in a wireless system, in which there is a plurality of available uplink carriers for the random access. The apparatus can comprise means for monitoring a random access response, to get load related information for the plurality of available uplink carriers in the wireless system; means for determining one low-loaded uplink carrier according to the load related information; means for performing a random access on the low-loaded uplink carrier.

A fifth aspect of the present invention is a method for random access in a random access node. The method can comprise determining load related information for uplink carries in a wireless system; and sending a random access response which contains load related information for multiple uplink carriers in the wireless system.

A sixth aspect of the present invention is an apparatus comprising a processor; and a memory communicatively connected to the processor, the memory comprises computer program codes embodied therein for use with the processor to at least partly cause the apparatus to: determine load related information for uplink carries in a wireless system; and send a random access response which contains load related information for multiple uplink carriers in the wireless system.

The seventh aspect is a computer program product comprising a computer-readable medium bearing computer program code embodied therein for use with an apparatus for performing a method of a random access of the fifth aspect.

The eighth aspect is an apparatus comprising means for determining load related information for uplink carries in a wireless system; means for, in response to the random access preamble, sending a random access response which contains load related information for multiple uplink carriers in the wireless system.

With the benefit of one or more aspects of the invention, the success probability of the contention based random access is improved and the latency is decreased.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE INVENTION

Exemplary embodiments of the present invention will be hereinafter described with reference to the drawings.

In the following scenarios for illustrating the present invention, when a UE is triggered to perform a contention based random access, a plurality of UL carriers are available to the UE and then the UE has to make a choice of UL carrier.

A basic idea of the present invention is to select a lowest-load UL CC for random access according to load related information carried in a random access response. In this regard, there are two schemes, one of which is utilizing load related information for multiple UL CCs to select a lowest-load UL CC at one time. In this scheme, the load related information for multiple UL CCs can be carried in one random access response message, and there may exist a need to modify the format of a normal RAR (Random Access Response) message. According to the other scheme, RAR messages of a carrier contain load related information only for that carrier, and UEs may need to try to receive from more than one carrier before they find a suitable carrier for random access. In this scheme, there is no need to modify the format of a normal RAR message.

Figure 1:
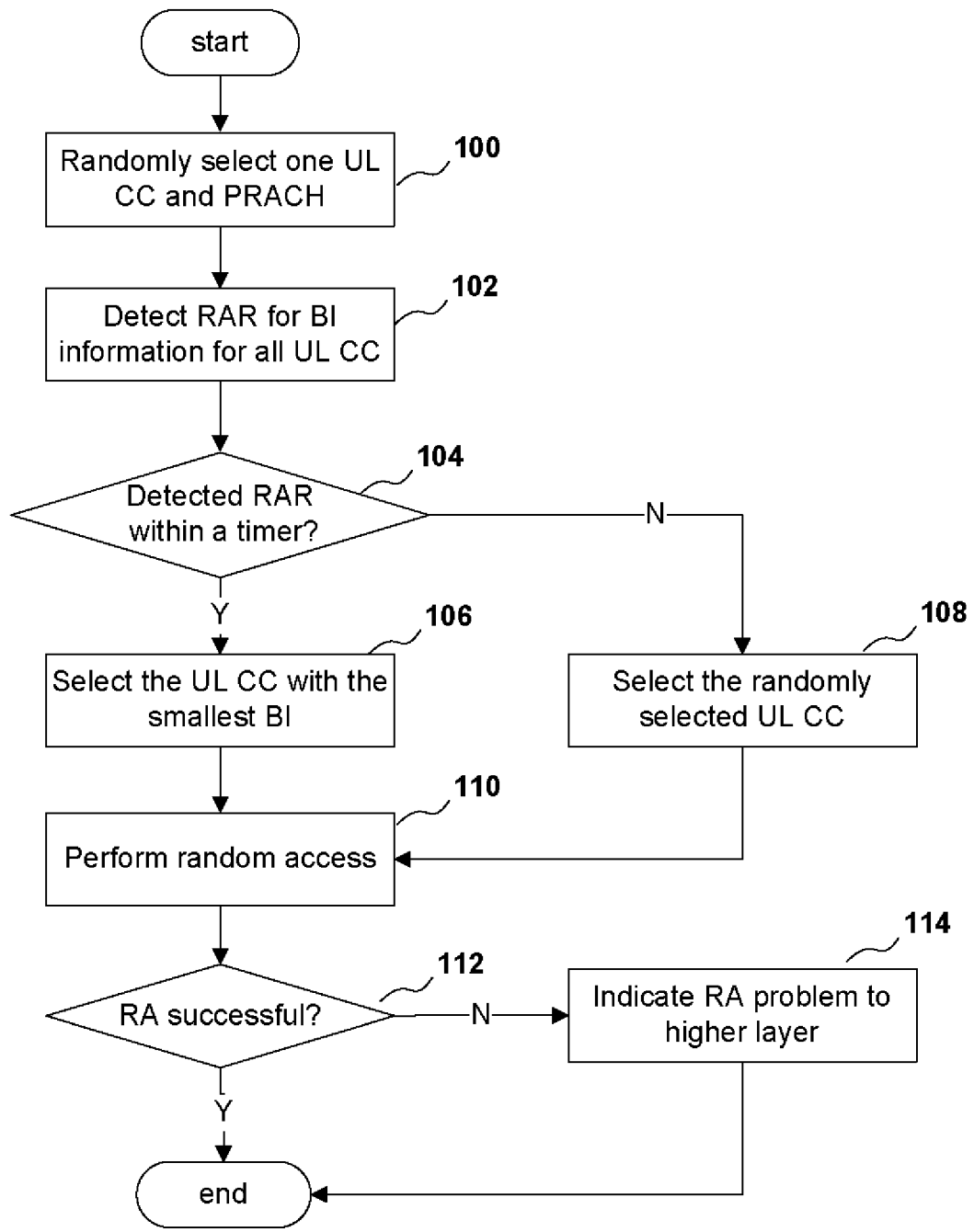
FIG. 1 is a flow chart illustrating a method for random access according to an exemplary embodiment of the present invention.

FIG. 1 is a flow chart illustrating a method for random access according to an exemplary embodiment of a first scheme of the present invention. When a UE is triggered to perform a contention based random access and there are multiple UL CCs available for it, the UE can first randomly select one UL CC (Component Carrier) within the available CCs and one PRACH (Physical Random Access Channel) on the selected UL CC, as shown in step 100 in FIG. 1. The information related to a plurality of CCs configured to the UE and any possible PRACH for UE is learned by the UE prior to the beginning of random access. For example, when the UE is configured with multiple RACH, it can know on which UL CC(s) it can perform random access(s), and in which PRACH it can transmit random access preamble(s).

Then, before sending a random access preamble, the UE has a try to detect a possible RAR (Random Access Response) message(s) from eNB, in step 102. The RAR message(s) may be sent in response to any random access preamble transmitted by any UE in the PRACH selected in step 100.

Generally, in a random access procedure, when an eNB receives a random access preamble transmitted in a PRACH from a UE served by the eNB, the eNB will make a response by sending a RAR (Random Access Response) message. The scheduling information of the RAR message is carried in a PDCCH (Physical Dedicated Control Channel) corresponding to the PRACH in which the random access preamble is transmitted. Since a RAR messages is sent to all the UEs which transmit random access preamble(s) in the same PRACH resource, a UE can monitor a PDCCH to get the scheduling information for catching RAR message(s) corresponding to the PRACH (e.g. the PRACH selected in 100), as long as the UE has the knowledge of the PRACH. Even when the UE does not transmit any random preamble, the UE may also monitor a PDCCH to detect RAR message(s) which is(are) transmitted by eNB(s) in response to random access preambles transmitted in the selected available PRACH by other UE(s). In contrast, in the normal random access, a UE will monitor a PDCCH for a RAR message only when a random access preamble is transmitted by itself. In an example, the UE can monitor PDCCH for RAR message(s) identified by an RA-RNTI (Random Access-Radio Network Temporary Identifier) derived from the selected PRACH, in the same way as the normal random access.

If a RAR message is detected by the UE ("Y" in step 104), from the RAR message, the UE can get load related information of multiple UL CC(s) supported in the wireless system (such as a cell served by the eNB), regardless the UL CC is configured for the UE or not. The load related information can indicate the load condition of random access on every UL CCs, and it will be discussed in detail later. According to the load related information, the UE can smartly select one UL CC configured to it with the lowest load as in step 106. Then, the UE can proceed to perform a random access on the selected UL CC with the lowest load in step 110.

In an exemplary embodiment, the load related information could be the backoff indicators (BIs). It can be easily appreciated that a higher backoff value of UL CC means a heavier load, i.e. there are many UEs being trying to access to the eNB on the UL CC. Thus, the UE can select the UL CC with the smallest backoff value as the lowest-load UL CC.

In an alternative exemplary embodiment, the load related information could be collision probability of contention based random access. The collision probability can be quantitatively depicted, e.g. a percentage value, and then it can be easily appreciated that a higher collision probability of UL CC means a heavier load, i.e. there are many UEs being trying to access to the eNB on the UL CC. Thus, the UE can select the UL CC with the smallest value of collision probability as the lowest-load UL CC. Alternatively the collision probability can be qualitatively depicted, such as a limited rank, e.g. "low", "medial" and "high". In this case, the UE can similarly select the UL CC with the lowest rank of collision probability as the lowest-load UL CC.

In an exemplary embodiment, a timer can be preconfigured for the detecting of RAR messages, e.g. 10 ms. For example, when the UE detect no RAR message, within the preconfigured timer ("N" in step 104), it can be concluded that there is few UE being trying to access (i.e. transmitting a random access preamble) to the eNB on the used UL CC, namely the randomly selected UL CC in step 100. Then the UE can directly select the used UL CC as the UL CC with the lowest load, as shown in step 108, and perform a random access on the UL CC selected in step 106 in step 110.

In an exemplary embodiment, not all of the existing UL CCs of the cell supported by the eNB are configured to the UE. That is to say that there may be some UL CCs that the UE has not been configured. In this case, when the UE detects RAR message(s) containing both load related information of multiple or all UL CCs configured to it and UL CCs not configured to it (for example load related information of all UL CCs of the cell), the UE could just ignore the load related information of UL CCs not configured to it.

In step 110, the UE can perform a contention based random access as the random access procedure on the UL CC selected in step 106 until the random access is successful (e.g. contention resolution succeeds) or failed (e.g. a preamble retransmission timer predefined for the UE reaches a Preamble TransMax), as shown in step 112. When the random access is failed ("N" in step 112), UE could indicate random access problem to the higher layer to declare radio link failure, and do RRC connection re-establishment, in step 114.

Figure 2:
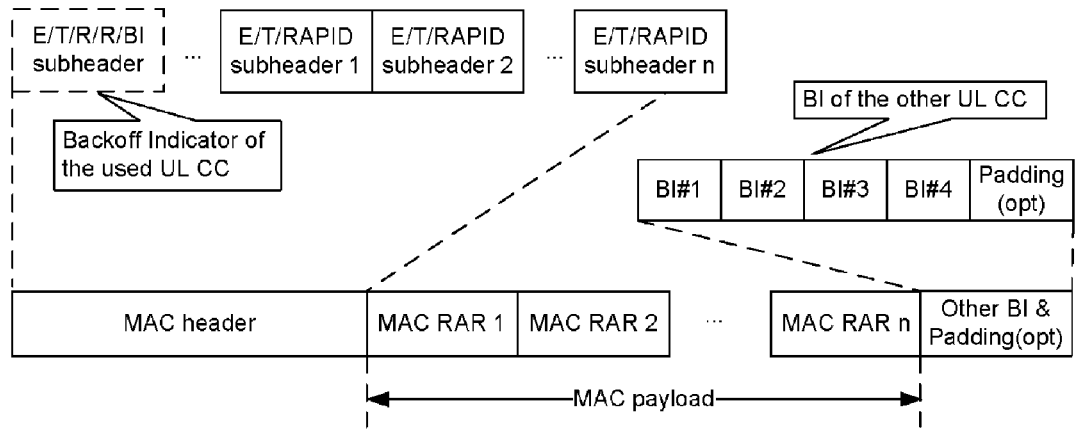
FIGS. 2 and 3 schematically illustrates modified formats of Random Access Response MAC PDU according to exemplary embodiments of the present invention.
Figure 3:
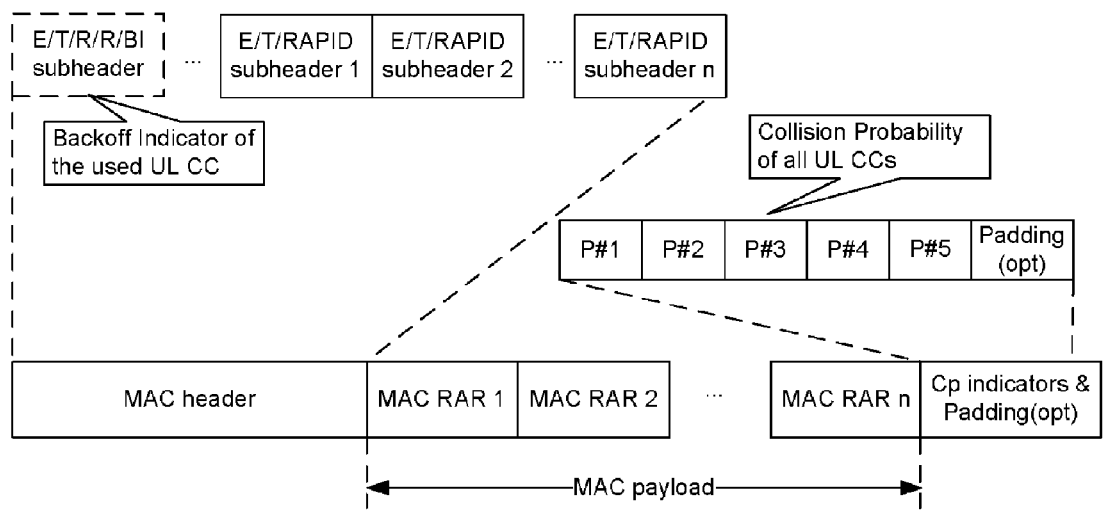

In the embodiments as shown in FIG. 1, to support the CC selection, load related information of all UL CCs is carried in the RAR message from eNB. FIGS. 2 and 3 schematically illustrates modified formats of RAR MAC PDU used for carrying all the UL CC's load information.

In an example, BI is utilized as the load related information. As is can be seen in FIG. 2, the BI for the used UL CC (i.e. the UL CC randomly selected for detecting the RAR message in step 100) is carried in the BI subheader field of the detected RAR message as a traditional RAR MAC PDU, and the BIs for all other UL CCs (such as BI#1, BI#2, BI#3, and BI#4) are carried in the padding field of the RAR message. It can be seen that except of the padding field, there need no change to the format of the traditional RAR MAC PDU. This arrangement of BI can provide a good backward compatibility.

In exemplary examples of the present invention, the BIs for all other UL CCs can be ordered in the sequence of the CC index or the CC frequency, for example in an ascending order of the CC frequency (i.e. from high frequency to low frequency or vice versa).

In some embodiments, not all the UEs will be configured with all the UL CCs of a cell, and also traditionally the CC indexes are UE specific, so if the same CC are configured as different index to different UE, there will be some misunderstanding between multiple UEs and eNB. To solve the above problem, the eNB can be restricted to allocate each CC the same index for all UEs. For example, a UE may be configured with CC1 and CC3 but not CC2, and the CC index indicated to the UE is 1 and 3 and then the UE can correctly ignore CC2 that is not configured to it. In the example that the BIs for all other UL CCs are ordered in the sequence the CC frequency, every UE can uniquely identify the UL CC by frequency order, as long as if UE have all the CC's information. Thus, every UE is able to seek for the BIs of all UL CCs configured to it based on the frequency order.

In an example, collision probability is utilized as the load related information. As is can be seen in FIG. 3, the collision probability for all UL CCs are carried in the padding field of the RAR message, such as P#1, P#2, P#3, P#4 and P#5). Except of this, there need no change to the format of the traditional RAR MAC PDU. By re-using the padding bits at the end of the RAR MAC PDU, the present invention can provide a good backward compatibility. Similar as BI, the collision probabilities of all UL CCs can also ordered in sequence of the CC index or the CC frequency, for example in an ascending order of the CC frequency (i.e. from high frequency to low frequency or vice versa). In the case that the CC index is utilized to order the collision probabilities of all UL CCs, for all UEs, the same CC the same UE index refers to the same UL CC.

In an exemplary embodiment, if there is more than one UL CCs with the same backoff value or collision probability value, UE can treat them equally and randomly select one of them to perform random access.

Figure 4:
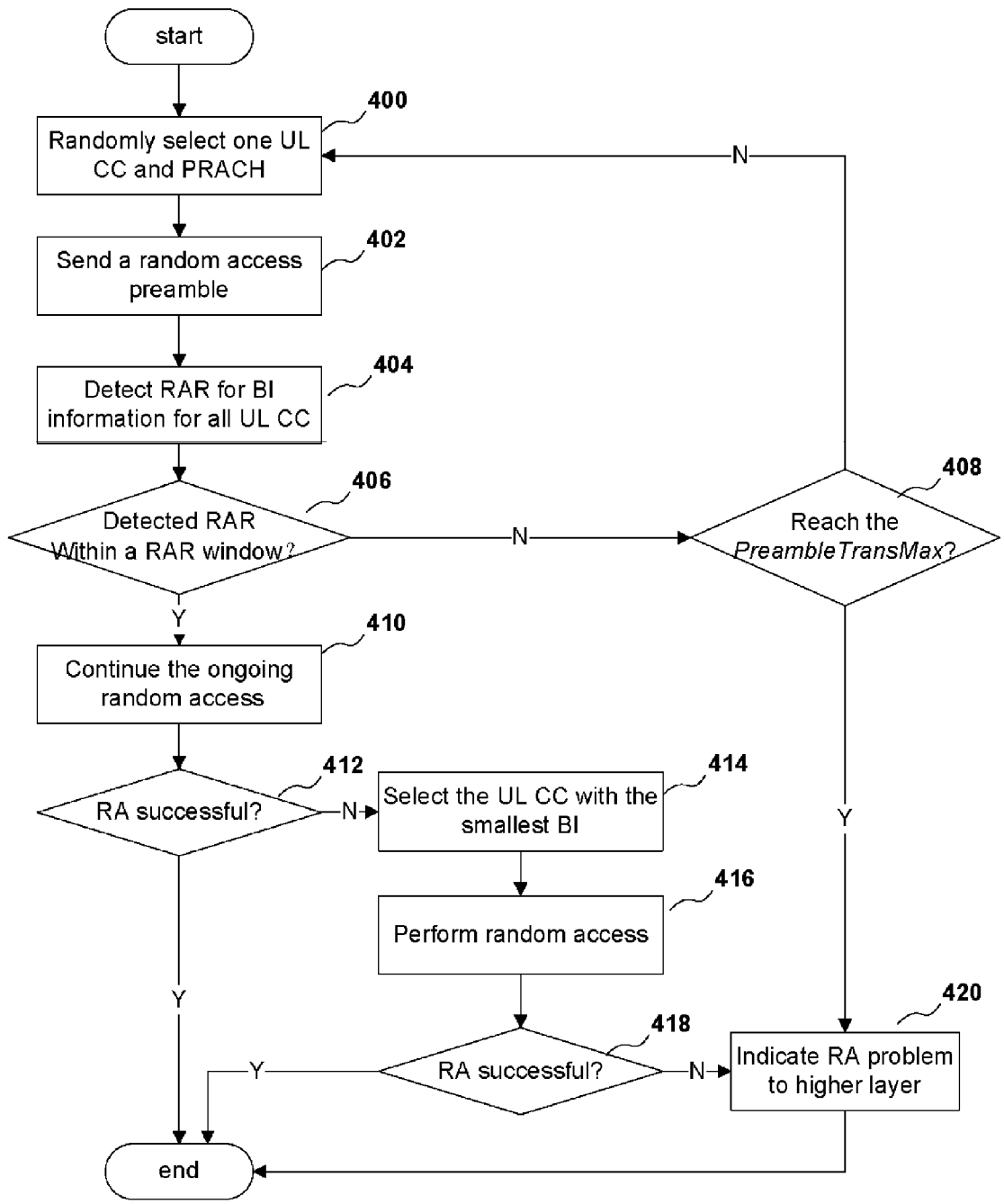
FIG. 4 is a flow chart illustrating a variant of the method shown in FIG. 1, according to an exemplary embodiment of the present invention.

FIG. 4 is a flow chart illustrating a variant of the method shown in FIG. 1. Different from the solution as shown in FIG. 1, when a UE is triggered to perform a contention based random access and there are multiple UL CCs available for it, the UE can firstly send a random access preamble to try a first random access on one of the multiple available UL CC, and do a CC selection of the lowest-loaded UL CC when this attempt of the first random access is failed and a RAR message(s) was detected. In an exemplary embodiment, the UE can randomly select one UL CC within the available CCs and one PRACH on the selected UL CC, and then send a random access preamble in the PRACH to try a normal random access. If fortunately this try succeeds, there is nothing needed to do for an additional selection of UL CC. Otherwise, if it is failed, the UE will do an additional CC selection according to load related information of all UL CCs got from the detected RAR message in response to the random access preamble, and re-try a random access on the lowest-load UL CC.

Now reference is made to FIG. 4 to discuss this variant in detail. As shown in step 400 in FIG. 4, the UE can first randomly select one UL CC within the available CCs and one PRACH on the selected UL CC. Then, different from the method as shown in FIG. 1, the UE sends (402) a random access preamble to an eNB, before trying to detect a possible RAR message. Then the UE has a try to detect (404) a RAR message from eNB. For example, the UE could wait for the eNB to response to the random access preamble transmitted by the UE, within a RAR window (i.e. a timer) as in a normal random access procedure.

Different form the solution shown in FIG. 1, when a RAR message is detected by the UE, the UE can accept the load related information (e.g. BI) for all UL CCs in the RAR message and continues to perform the ongoing normal random access (410) on the UL CC selected in step 400, but for just one attempt, for example. The operation of the continuous normal random access in step 410 can comprise decoding the RAR message to get the RAR with respect to the UE's random access preamble identifier (RAPID), transmitting Msg3 to the eNB and the procedure of contention resolution, etc.

When this first random access attempt is failed ("N" in 412), the UE will select one available UL CC with the smallest BI by using BIs of all UL CCs carried in the detected RAR message, and re-try a random access on this lowest-load UL CC in steps 414, 416, 418 and 420 until it is successful (e.g. contention resolution succeeds) or failed (e.g. reach to Preamble TransMax), as steps 106, 110, 112, and 114 of the method shown in FIG. 1. The RAR message in this method can has the same format as that shown in FIGS. 2 and 3.

In an exemplary embodiment, when the UE detect no RAR message ("N" in step 406), for example within a RAR window, it can return step 400 to select a UL CC and PRACH to try a random access again, for example until a preamble retransmission timer predefined for the UE reaches a Preamble TransMax, as shown in step 408.

In an exemplary embodiment, not all of the existing UL CCs of the cell supported by the eNB are configured to the UE. That is to say that there is some UL CCs that the UE has not been configured. In this case, when the UE detects RAR message(s) containing load related information of all UL CCs of the cell, the UE could just ignore load related information of UL CCs not configured to it.

In the solutions discussed above with respect to the first scheme of the invention, load related information of all UL CC(s) supported in the cell is carried in one RAR message. As mentioned above, to implement these solutions, there is a need to modify the traditional formats of RAR message. For example, some bits in the padding field of RAR MAC (Media Access Control) PDU (Protocol Data Unit) can be adapted to carry the BIs for all UL CCs in a wireless system, such as a cell supported by an eNB. In an example, the BI for the used UL CC can be carried in the BI subheader field as it is in the traditional format, and the other BI can be carried in the padding field, as shown in FIG. 2. Besides the inconvenience caused from the modification of the format of RAR message, these solutions may introduce more overhead for signaling of the BIs (or other load related parameters) of all the UL CCs in every RAR message corresponding to every PRACH on every UL CC.

Through the following solutions, a selection of UL CC can be implemented, under a condition that the format of RAR message needs not to be modified, and eNB does not need to signal the BIs (or other load related parameters) of all the UL CCs in every RAR message corresponding to every PRACH on every UL CC.

Figure 5:
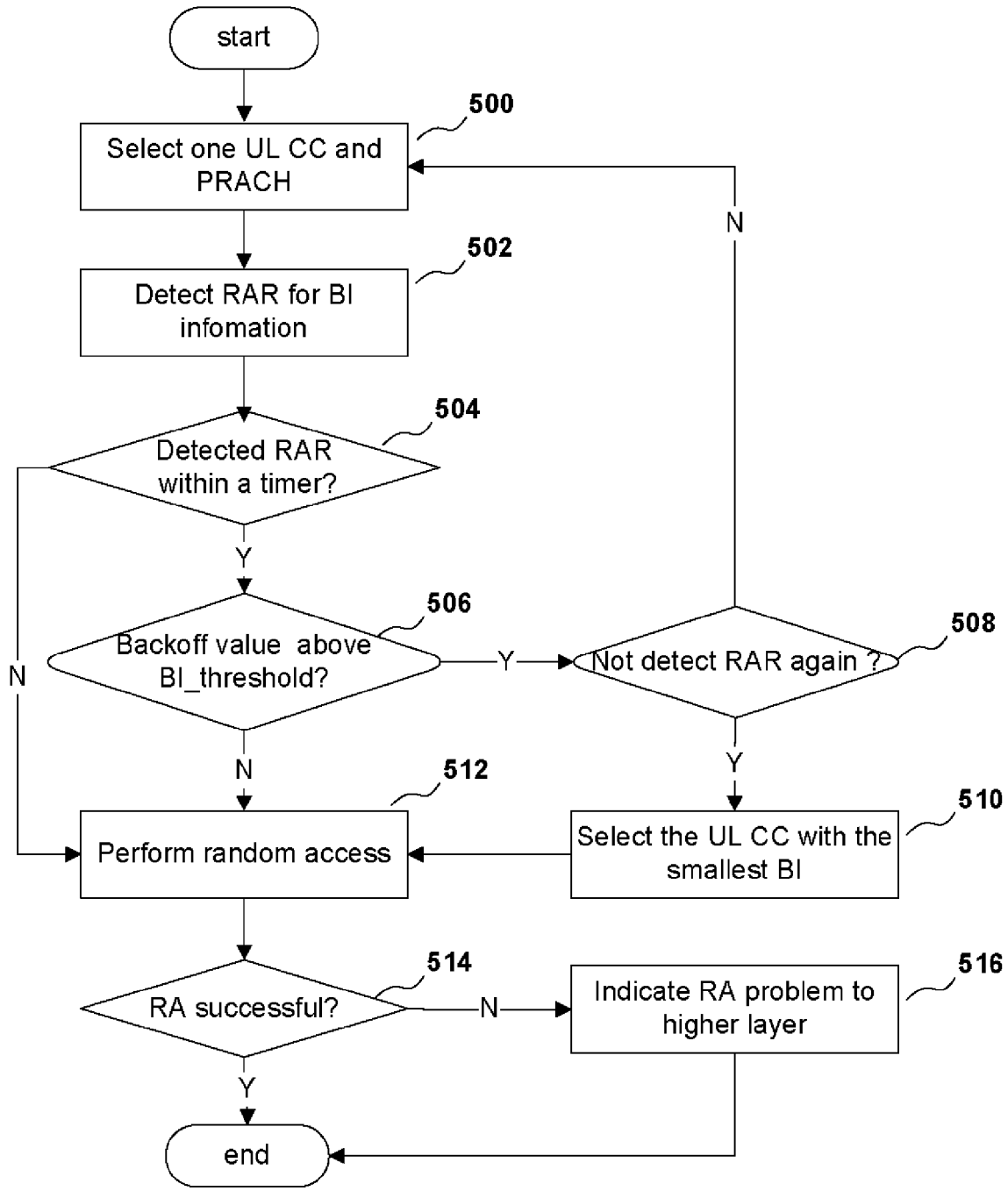
FIG. 5 is a flow chart illustrating a method for random access according to another exemplary embodiment of the present invention.
Figure 6:
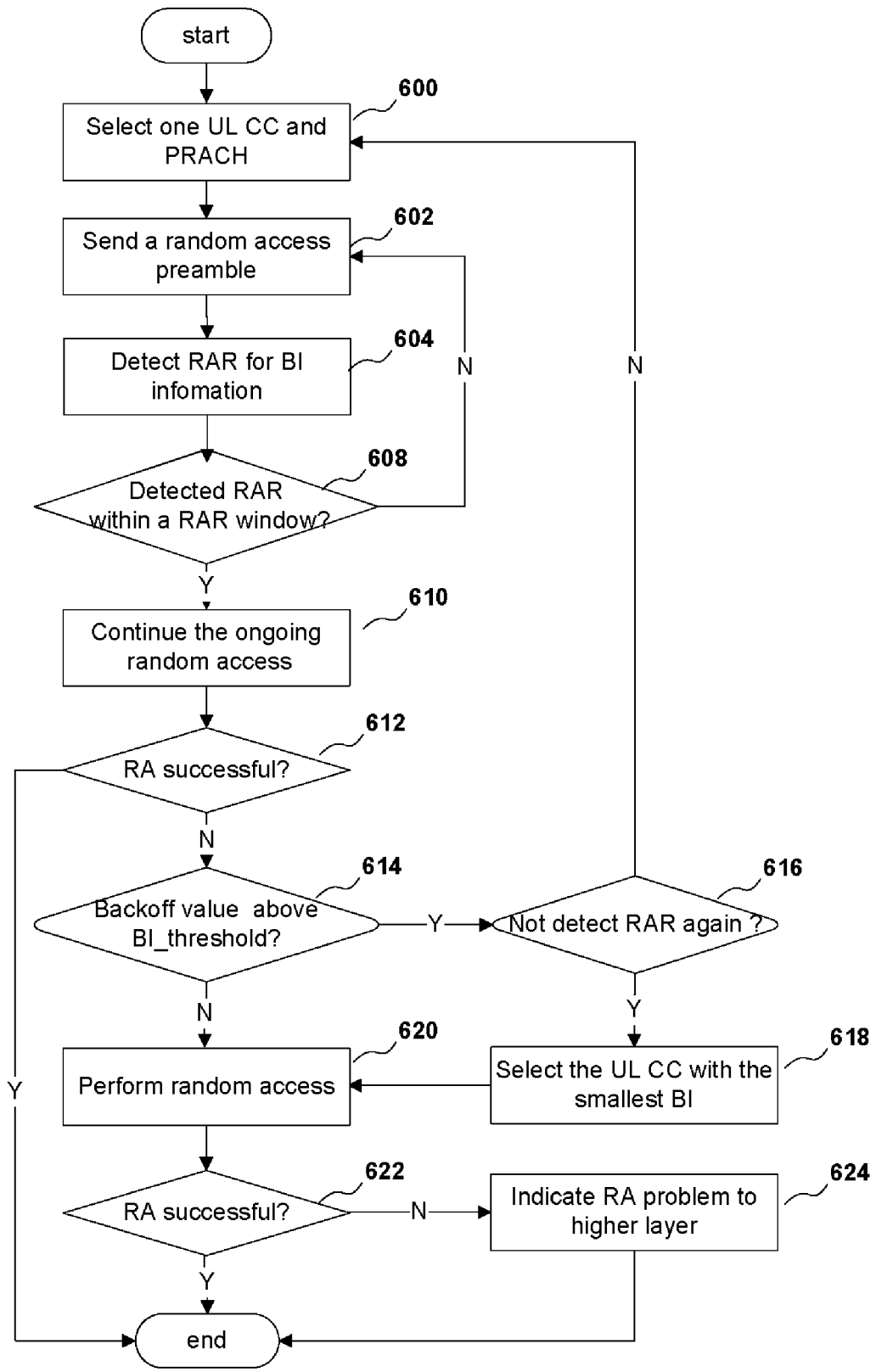
FIG. 6 is a flow chart illustrating a variant of the method shown in FIG. 5, according to an exemplary embodiment of the present invention.
Figure 7:
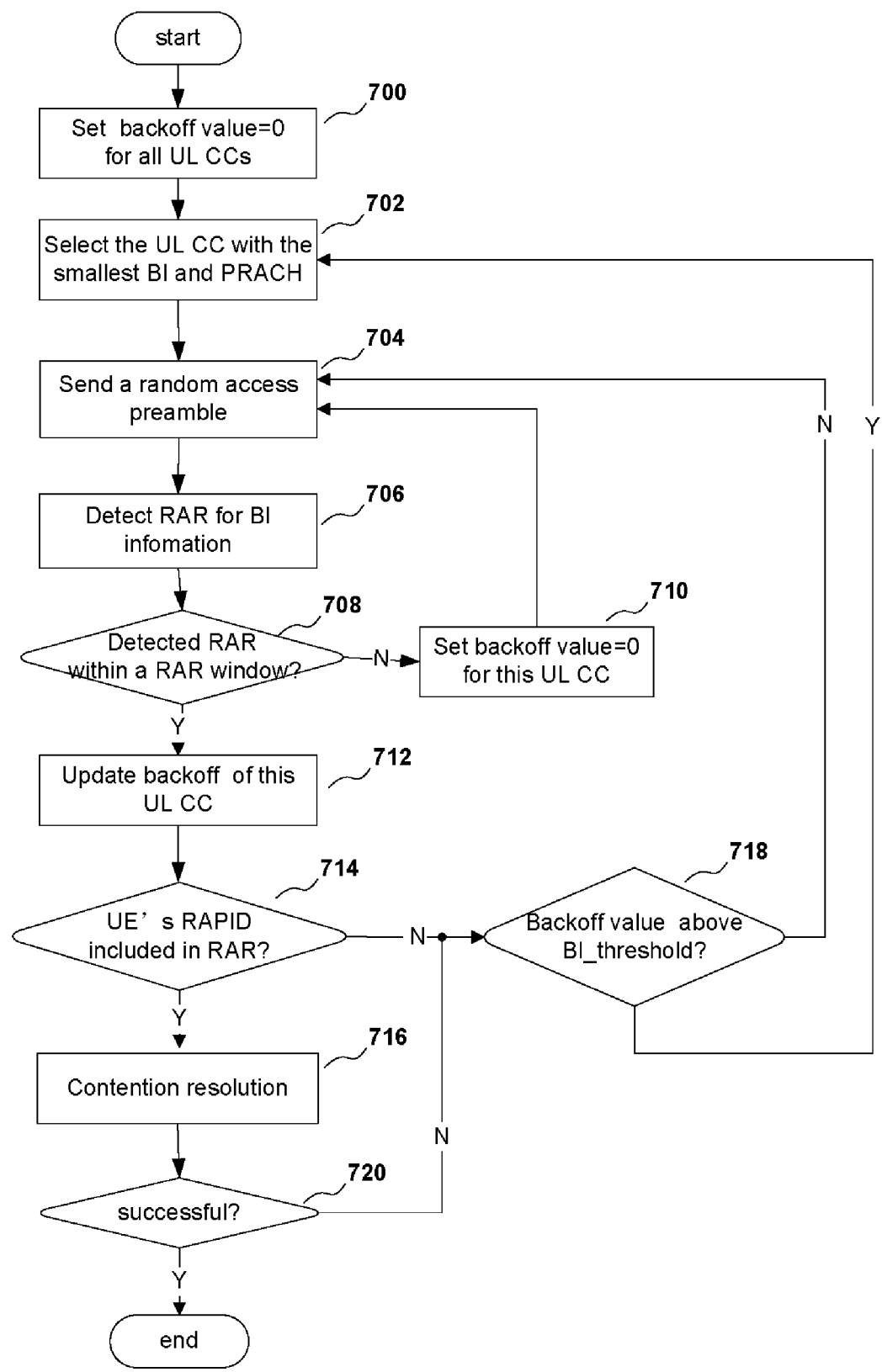
FIG. 7 is a flow chart illustrating another variant of the method shown in FIG. 5, according to an exemplary embodiment of the present invention.

The second scheme of the invention can avoid these problems to some extent. FIGS. 5 to 7 are flow charts illustrating solutions for random access according to an exemplary embodiment of the second scheme of the present invention.

In the embodiments illuminated in FIG. 5, when a UE is triggered to perform a contention based random access and there are multiple UL CCs available for it, the UE can detect RAR messages for each of the multiple available UL CCs, and try to find a UL CC whose BI is lower than the a predefined threshold (hereinafter referred to as BI_threshold), in the beginning of a random access procedure.

Specifically, the UE can first select one UL CC within the available CCs and one PRACH on the selected UL CC, as shown in step 500 in FIG. 5. Then, before sending a random access preamble, the UE has a try to detect a possible RAR message(s) from eNB, in step 502. The RAR message(s) may be sent in response to any random access preamble transmitted by any UE in the PRACH selected in step 500. The steps 500 and 502 can be performed in the same way as the steps 100 and 102 in the method shown in FIG. 1. Different from the method shown in FIG. 1, when a RAR message of a UL CC is detected by the UE ("Y" in step 504), the RAR message contains load related information only for that UL CC. That is to say, only at most one BI for the used UL CC (i.e. the UL CC selected in step 500) is included in the RAR message. Then, the UE compares the backoff value indicated by the BI for the used UL CC with a predefined BI_threshold, to determine if the backoff value is above the BI_threshold, in step 504.

The value of the parameter BI_threshold can be predefined in a standard/protocol, or signaled to the UE in some system information. The BI_threshold value could be zero. When a backoff value is lower than or equal to the BI_threshold ("N" in step 506), it can be determined that the load of random access in currently used UL CC (i.e. the present UL CC selected in step 500) is normal or light, and it is appropriate to choose this UL CC for random access without further considerations. Then the UE can proceed to perform a random access on the UL CC selected in step 500.

As shown in step 512, the UE can perform a contention based random access on the selected UL CC as a normal random access until the random access is successful (e.g. contention resolution succeeds) or failed (e.g. a preamble retransmission timer predefined for the UE reaches a Preamble TransMax), as shown in step 514. When the random access is failed ("N" in step 514), UE could indicate random access problem to the higher layer to declare radio link failure, and do RRC connection re-establishment, in step 516.

When a backoff value is higher than the BI_threshold ("Y" in step 506), it can be determined that the load of random access on the currently used UL CC is high and UE should avoid this UL CC if it can. Then, the UE can return to step 500, to detect BI for another available UL CC again until a BI lower than or equal to the BI_threshold is found.

In an embodiment of the present invention, when the UE find no BI for its available UL CC lower than or equal to the BI_threshold, the UE can select from the visited CCs whose BI value UE has detected, the CC with the smallest backoff value, as shown in step 510. In an example, the UE can try to detect RAR message for each of the multiple available UL CCs one by one, if the answer to "not detect RAR message again" is negative ("N" in step 508), for example when there remain any available UL CC not visited or a timer for trying random access is not expired. If the answer to "not detect RAR message again" is positive ("Y" in step 508), for example when the all of the multiple UL CCs had been visited or a timer is expired, and all of the detected backoff values are higher than the BI_threshold, then the UE can select the CC with the smallest backoff value, according to all the detected backoff values. Then the UE can perform a contention based random access on the UL CC with the lowest backoff value, until the random access is successful or failed, as shown in steps 512, 514, and 516.

In an exemplary embodiment, a timer can be preconfigured for the detecting of RAR messages, e.g. 10 ms. When the UE detect no RAR message, for example within the preconfigured timer, it can be concluded that the selected UL CC is lightly loaded. Then the UE can consider the selected UL CC as an allowable UL CC with the equal to zero, and directly perform a random access on the currently used UL CC, as shown in the arrow "N" of step 504.

FIG. 6 shows a variant of the method shown in FIG. 5. Different from the solution shown in FIG. 5, when a UE is triggered to perform a contention based random access and there are multiple UL CCs available for it, the UE can first selects one UL CC within the available CCs and one PRACH on the selected UL CC, and then have a try to perform a normal random access. If fortunately this try succeeds, there is no needed to do an additional CC selection of low-loaded UL CC. Otherwise, if it is failed and the RAR message was detected, the UE will do an additional selection according to BI in the detected RAR message in a manner similar to the scheme as shown in FIG. 5.

Now reference is made to FIG. 6 to discuss an embodiment of this variant in detail. As shown in step 600 in FIG. 6, the UE can first randomly select one UL CC within the available CCs and one PRACH on the selected UL CC. Then, different from the solution shown in FIG. 5, the UE sends (602) a random access preamble to an eNB, before trying to detect a possible RAR message. Then the UE has a try to detect (604) a RAR message from eNB. For example, the UE could wait for the eNB to response to the random access preamble transmitted by the UE, within a RAR window (i.e. a timer) as in a normal random access procedure.

Different form the method shown in FIG. 5, when a RAR message is detected by the UE, the UE can accept the BI for the currently used UL CC in the RAR message and continues to perform the ongoing normal random access (610) on the UL CC selected in step 600, for example for just one attempt. The operation of normal random access in step 610 can comprise decoding the RAR message to get the RAR with respect to the UE's RAPID, transmitting Msg3 to the eNB and the procedure of contention resolution, etc.

Only when this random access attempt is failed, the UE will do an additional CC selection in a similar way as the solution shown in FIG. 5.

Specifically, when this random attempt is failed ("N" in 612) and a RAR message is detected, the UE compares the backoff value indicated by the BI in the detected RAR message with a predefined BI_threshold, to determine if the backoff value is higher than the BI_threshold, in step 614. When the backoff value is lower than or equal to the BI_threshold ("N" in step 614), the UE takes this currently selected UL CC as the appropriate CC without further considerations. Then, the UE can proceed to perform the random access on the currently selected UL CC, until the random access is successful or failed, as shown in steps 620, 622, and 624. In an alternative embodiment, when the backoff value is lower than or equal to the BI_threshold ("N" in step 614), the re-tried random access on this currently selected UL CC can be performed by returning to step 602 (not shown). The detailed description of this alternative operation will be further discussed with reference to FIG. 7.

When the backoff value is higher than the BI_threshold ("Y" in step 614), and optionally the answer to "not detect RAR message again" is negative ("N" in step 616), the UE can return to step 600, to re-try a random access on another UL CC.

In an embodiment, when all of the random access attempts (and optionally the answer to "not detect RAR message again" is positive) are failed and all the detected BIs are higher than the BI_threshold, the UE can select the CC from the visited CCs, with the smallest backoff value according to all the detected backoff values, as shown in step 618. Then the UE can perform a contention based random access on the UL CC with the lowest backoff value, until the random access is successful or failed, as shown in steps 620, 622 and 624.

In an embodiment, when the UE detect no RAR message ("N" in step 608), for example within the preconfigured timer, the UE can return to step 602 to re-try a random access (i.e. send a random access preamble) on the currently selected UL CC and PRACH. Alternatively, the UE can re-try a random access on the currently selected UL CC and another PRACH on the UL CC.

To further understand this scheme, now discuss another variant of the method of FIG. 5, with reference to FIG. 7. In step 700, when a UE is triggered to perform a contention based random access and there are multiple UL CCs available for it, the UE can set the backoff values for all available UL CCs to 0 (i.e. zero), as shown in step 700. Then the UE selects from the available CCs, the UL CC with the lowest backoff value and one PRACH on the selected UL CC, in step 702. Since the backoff values for all available UL CCs are the same at first, in effect a selection as step 602 of FIG. 6 is performed in step 702 at that time. Then the UE have a try to perform a normal random access in steps 704, 706, 708, 714, 716, and 720 in the same way as steps 602, 604, 608, 610 and 612, respectively.

In this embodiment, during this procedure of random access, the UE will update the backoff value for the currently used UL CC with the detected one, in step 712.

In this embodiment, after a RAR is detected, the UE performs the ongoing normal random access on the UL CC selected in step 702. The ongoing normal random access comprises decoding the RAR message to get the RAR with respect to the UE's RAPID, transmitting Msg3 to the eNB and the procedure of contention resolution. If this random access attempt is failed, for example the UE's RAPID is not included in the RAR message ("N" in 714), or the contention resolution is not successful ("N" in 720), then the UE will compare the backoff value for the currently used UL CC with a predefined BI_threshold. When the backoff value is lower than or equal to the BI_threshold ("N" in step 718), the process can continue to perform the random access on this currently selected UL CC by returning to step 704. Accordingly, it can be seen that the UE will continue to perform the random access until it is successful or the backoff value for this UL CC is higher than the BI_threshold. When the backoff value is higher than the BI_threshold ("Y" in step 718), the UE can return to step 702 to re-try a random access on another UL CC.

In an embodiment, when the UE detect no RAR message ("N" in step 708), for example within a RAR window, the UE concludes that the currently used CC is lightly loaded and set the backoff value for this CC to zero as shown in step 710. Then the UE return to step 704 to re-try a random access (i.e. send a random access preamble) on the currently selected UL CC and PRACH.

Compared with the solution illustrated in FIG. 5, the solution illustrated in FIGS. 6 and 7 can minimize the delay in the case that most UL CCs in the cell are lightly loaded. In other words, the solution illustrated in FIG. 5 would lead to a larger delay, while preventing the case where the first preamble transmission is performed on a congested UL CC but at least one of the UL CCs in the cell is lightly loaded.

Figure 8:
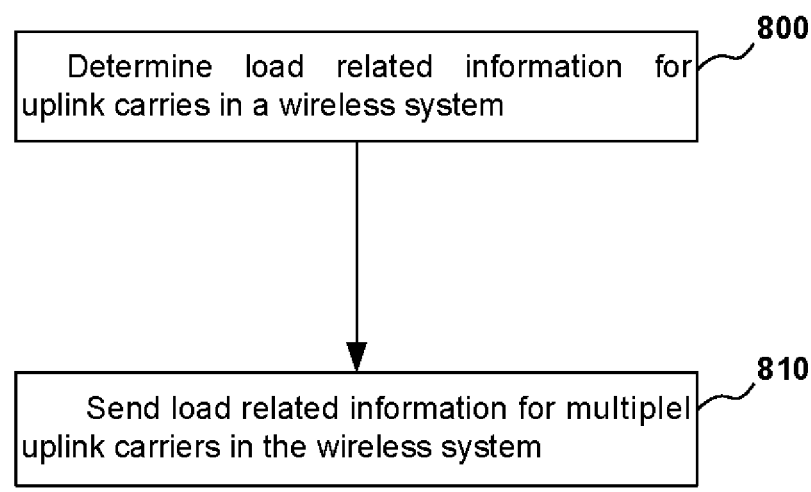
FIG. 8 is a flow chart illustrating a method for random access according to an exemplary embodiment of the present invention.

FIG. 8 is a logic flow diagram that illustrates the operations of a method, and a result of executions of computer program instructions, in accordance with the exemplary embodiments of this invention for random access in a network node such as an eNB.

At block 800, there is a step of determining load related information for uplink carries in a wireless system, for example by an eNB. The eNB can measure or estimate the random access channel or other load on the uplink carriers to determine load related information for the carriers. Then, at step 810, there is a step of sending a random access response that contains load related information for multiple uplink carriers in the wireless system, to direct the random access attempts to the best uplink carriers. The random access response can be transmitted in response to a random access preamble from a terminal device (such as a UE) in a PRACH on one UL CC supported by the eNB. The random access response can be sent to all UEs that are trying random accesses in that PRACH. Thus, a UE receiving the random access preamble can determine a low-loaded UL CC to perform a random access according to the received load related information. In an extreme case, the eNB might not even try to detect any preambles on a highly loaded carrier, but would send a RAR message(s) that does not include anything else than load indicators indicative of load related information. The random access response can be organized with the formats as shown in FIGS. 2 and 3.

Figure 9:
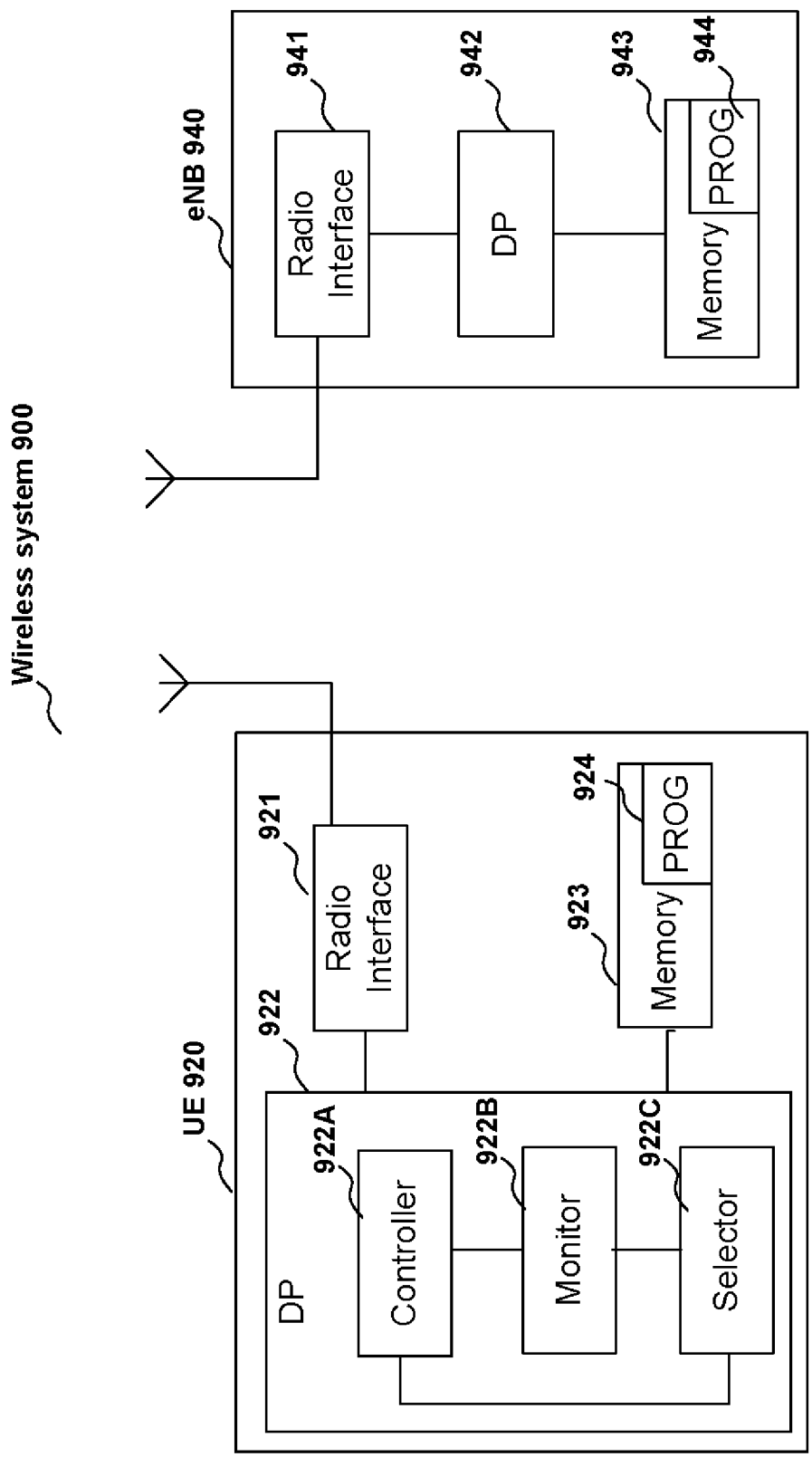
FIG. 9 is a block diagram illustrating devices in which the present invention may be implemented.

Now reference is made to FIG. 9 illustrating a simplified block diagram of a wireless system that is suitable for use in practicing various embodiments of the present invention. In FIG. 9, a wireless system 900 is adapted for a contention based random access. The system 900 comprises a terminal device such as a mobile communication device that may be referred to as a UE 920, and a network access node, such as an eNB (base station) 940. When the UE is triggered to perform a contention based random access, there is a plurality of available uplink carriers for the random access. Then, the UE 920 can perform a random access to the eNB according to the exemplary embodiments of the present invention as discussed above. Although there is only one terminal device is shown in FIG. 9, in practice there will be a plurality of terminal devices in the wireless system.

In general, the various embodiments of the UE 920 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The UE 920 includes a DP 922, a memory 923 that can store a program 924 and related data used in the process of the present invention such as load related information for UL CCs, and a suitable radio interface 921 for wireless communications with the eNB 940 via one or more antennas. In an exemplary embodiment, the radio interface 921 can comprise a transmitter and receiver (or a transceiver) for transmitting messages (such as random access preamble, Msg3) to the eNB 940 and receiving messages (such as random access response) from the eNB 940 respectively for a random access.

The eNB 940 also includes a DP 942, a memory 943 that stores a PROG 944 and related data used in the process of the present invention such as load related information for UL CCs, and a suitable radio interface 941 for wireless communications with the UEs via one or more antennas. In an exemplary embodiment, the radio interface 941 can comprise a transmitter and receiver (or a transceiver) for transmitting messages (such as random access response) to the UE 920 and receiving messages (such as random access preamble, Msg3) from the UE 920 respectively for a random access.

The memorys 923, 943 may be of any type suitable to the local technical environment and may be implemented using any suitable data storage technology, such as semiconductor based memory devices, flash memory, magnetic memory devices and systems, optical memory devices and systems, fixed memory and removable memory. The DPs 922, 942 may be of any type suitable to the local technical environment, and may include one or more of general purpose computers, special purpose computers, microprocessors, digital signal processors (DSPs) and processors based on multi-core processor architectures, as non-limiting examples.

At least one of the PROGs 924, 944 is assumed to include program instructions that, when executed by the associated DP, enable the terminal device to operate in accordance with the exemplary embodiments of this invention, as discussed above. That is, the exemplary embodiments of this invention may be implemented at least in part by computer software executable by the DP 922 of the UE 920, and by the DP 942 of the eNB 940, or by hardware, or by a combination of software and hardware. The basic structure and operation of UE 920 and eNB 940 are known to one skilled in the art.

In an exemplary embodiment, the DP 922 can further comprises a controller 922A, configured to control processes of random access conforming to a normal random access, which for example comprises sending a random access preamble to an eNB, receiving a RAR message in response to the random access preamble, transmitting Msg3, and contention relation. The DP 922 can further comprise a monitor 922B configured to monitor a random access response, to get load related information for the plurality of available uplink carriers; and a selector 922C configured to determine one low-loaded uplink carrier according to the load related information. In the embodiments of the invention, the controller 922A is configured to operatively be coupled with a monitor 922B and a selector 922C, to perform a random access on an appropriate UL CC determined by the monitor 922B and the selector 922C.

In a design, the monitor 922B can be configured to monitor a RAR message containing load related information for all UL CCs in the wireless system, as in the first scheme of the invention. In a design, the monitor 922B can monitor a RAR corresponding to a random access preamble on one available UL CC, which contains one backoff indicator for said one available UL CC, as in the second scheme.

The selector 922C can be configured to perform the selection for low-loaded UL CC according to various embodiments discussed above, to select the appropriate UL CC on which a random access can be performed with a high success probability and low latency. In a design, the selector 922C can be configured to determine one the lowest-load UL CC according to first scheme of the invention. In a design, the selector 922C can be configured to compare the backoff value with a predefined threshold to select an appropriate UL CC, as in the second scheme of the invention.

It should be noted that the blocks in the terminal device 920 and network access node 940 are described in the terms of their functionalities, and as will be appreciated by one of skill in the art, the functionality of the modules may be combined or distributed as desired in various embodiments. The blocks 921, 922 (including 922A, 922B, 922C), 923 in the terminal device 920 and blocks 941, 942, 943 in the network access node 940 can be embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

As such, it should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. A method comprising:
monitoring a random access response to get load related information for a plurality of available uplink carriers, wherein the load related information comprises at least one of a back-off indicator or an indicator of collision probability, wherein the random access response includes the load related information for the plurality of available uplink carriers;
determining, from the plurality of available uplink carriers, a low-loaded uplink carrier, wherein the determining is based on at least the load related information; and
performing a random access on the low-loaded uplink carrier.

2. The method of claim 1, wherein the indicator of collision probability is carried in a padding field of the random access response.

3. The method of claim 1, wherein the determining comprises selecting as the low-loaded uplink carrier an available uplink carrier with a lowest back-off value and/or a lowest collision probability.

4. An apparatus comprising:
at least one processor; and
at least one memory including computer program code, the at least one memory and the computer program code configured to, with the at least one processor, cause the apparatus to perform at least the following:

monitor a random access response to get load related information for the plurality of available uplink carriers, wherein the load related information comprises at least one of a back-off indicator or an indicator of collision probability, wherein the random access response includes the load related information for the plurality of available uplink carriers;

determine, from the plurality of available uplink carriers, a low-loaded uplink carrier, wherein the determine is based on at least the load related information; and perform a random access on the low-loaded uplink carrier.

5. The apparatus of claim 4, wherein the apparatus is further configured to get, from a subheader field of the random access response, the back-off indicator for an uplink carrier on which a random access preamble corresponding to the random access response is carried.

6. The apparatus of claim 4, wherein the apparatus is further configured to get, from a padding field of the random access response, the back-off indicator and/or the indicator of collision probability for at least one uplink carrier in a wireless system.

7. The apparatus of claim 4, wherein the apparatus is further configured to select as the low-loaded uplink carrier an available uplink carrier with a lowest back-off value and/or a lowest collision probability value.

8. The apparatus of claim 4, wherein the apparatus is further configured to monitor the random access response by at least:

a selection of at least one of the plurality of available uplink carrier and at least one random access channel on the selected available uplink carrier; and an attempt to detect a corresponding random access response to the at least one selected random access channel to get the load related information for at least one of the plurality of available uplink carriers.

9. The apparatus of claim 4, wherein the apparatus is further configured to monitor the random access response by at least:

a selection of at least one of the plurality of available uplink carrier and at least one random access channel on the selected available uplink carrier; and an attempt to detect a corresponding random access response to the selected random access channel to get the back-off indicator for the at least one selected available uplink carrier; and wherein the apparatus is further configured to determine one low-loaded uplink carrier by at least:

a determination of whether or not a back-off value is higher than a predefined threshold, wherein if the back-off value is lower than or equal to the predefined threshold the low-loaded uplink carrier is the selected uplink carrier.

10. A non-transitory computer-readable medium encoded with instructions that when executed by at least one processor, perform at least the following:

monitoring a random access response to get load related information for the plurality of available uplink carriers, wherein the load related information comprises at least one of a back-off indicator or an indicator of collision probability, wherein the random access response includes the load related information for the plurality of available uplink carriers;

determining, from the plurality of available uplink carriers, a low-loaded uplink carrier, wherein the determining is based on at least the load related information; and performing a random access on the low-loaded uplink carrier.

11. A method comprising:

monitoring a random access response to get load related information for a plurality of available uplink carriers, wherein the load related information comprises an indicator of collision probability, wherein the random access response includes the load related information for the plurality of available uplink carriers;

determining, from the plurality of available uplink carriers, a low-loaded uplink carrier according to the load related information, wherein the determining comprises selecting, as the low-loaded uplink carrier, an available uplink carrier with a lowest collision probability; and performing a random access on the low-loaded uplink carrier.

\* \* \* \* \*